Dec. 11, 1951

H. M. YOUNG 2,578,216

WIRE-FORMING MACHINE

Filed March 17, 1947

7 Sheets-Sheet 1

INVENTOR
HARRY M. YOUNG

BY Alfred W. Petchaft
ATTORNEY

Dec. 11, 1951 H. M. YOUNG 2,578,216

WIRE-FORMING MACHINE

Filed March 17, 1947 7 Sheets-Sheet 2

INVENTOR

HARRY M. YOUNG

BY Alfred W. Petchaft

ATTORNEY

INVENTOR
HARRY M. YOUNG
BY Alfred W. Petchaft
ATTORNEY

INVENTOR
HARRY M. YOUNG
BY Alfred W. Petchaft
ATTORNEY

INVENTOR
HARRY M. YOUNG
BY Alfred W. Petchaft
ATTORNEY

INVENTOR
HARRY M. YOUNG
BY Alfred W. Petchaft
ATTORNEY

INVENTOR
HARRY M. YOUNG
BY Alfred W. Petchaft
ATTORNEY

Patented Dec. 11, 1951

2,578,216

UNITED STATES PATENT OFFICE 2,578,216

WIRE-FORMING MACHINE

Harry M. Young, Webster Groves, Mo., assignor to Western Wire Products Company, St. Louis, Mo., a corporation of Missouri Application March 17, 1947, Serial No. 735,207

7 Claims. (Cl. 140—71)

This invention relates in general to forming machines and, more particularly, to wire-forming machines.

It is the primary object of the present invention to provide a wire-forming machine which is reliable, efficient, and economical in operating, being high-speed, and requiring a minimum of manual labor.

It is a further object of the present invention to provide a wire-forming machine which is rugged and relatively simple in construction.

It is a further object of the present invention to provide a wire-forming machine which is readily adaptable for producing a variety of formed wire articles such as pipe hangers, for example.

With the above and other objects in view, my invention resides in the novel features of form, construction, arrangement, and combination of parts presently described and pointed out in the claims.

In the accompanying drawings (seven sheets)—

Figures 1, 2:
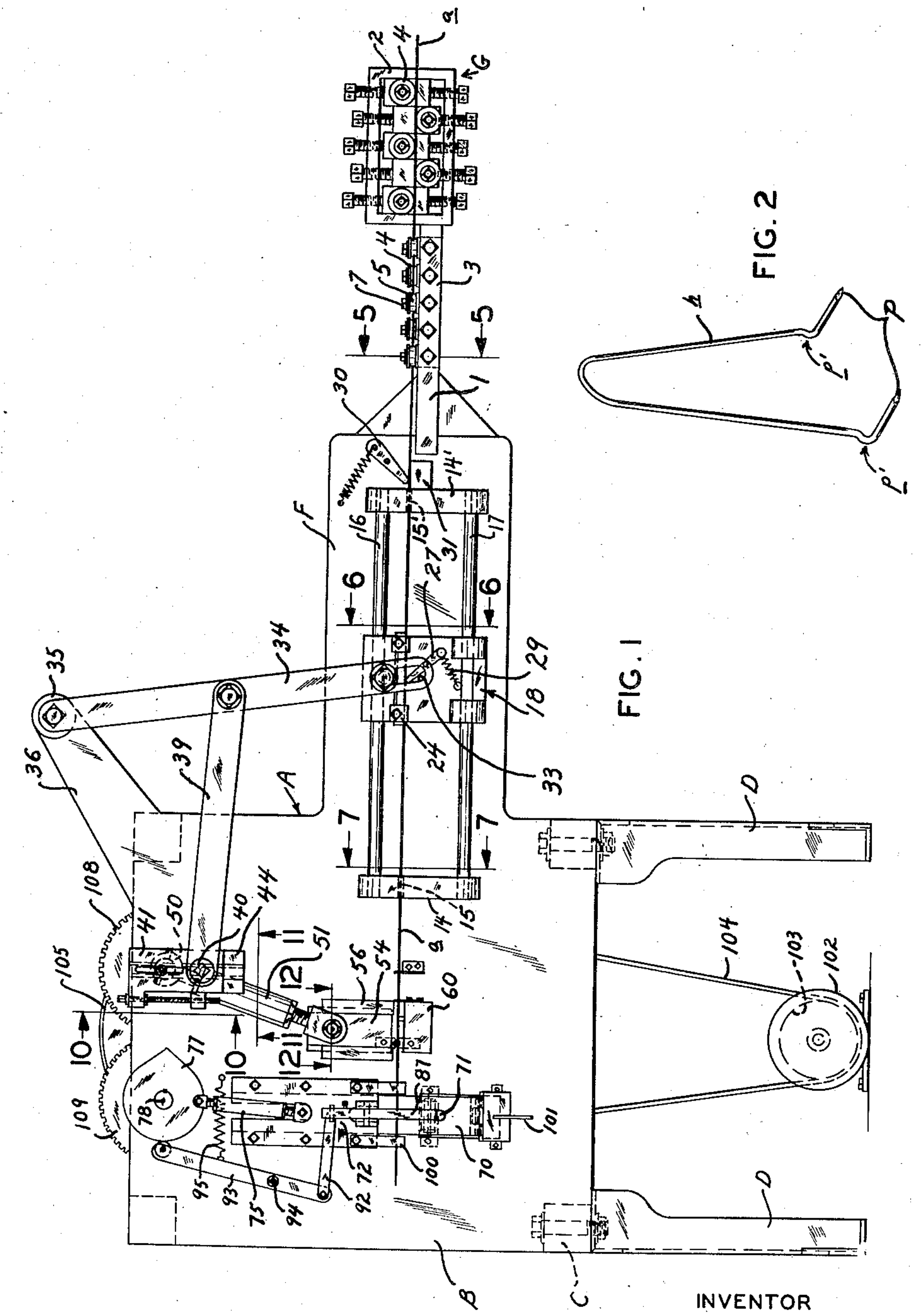
Figure 1 is a front elevational view of a wire-forming machine constructed in accordance with and embodying the present invention.
Figure 2 is a perspective view of the wire formed into a pipe hanger by the wire-forming machine of the present invention.
Figure 4:
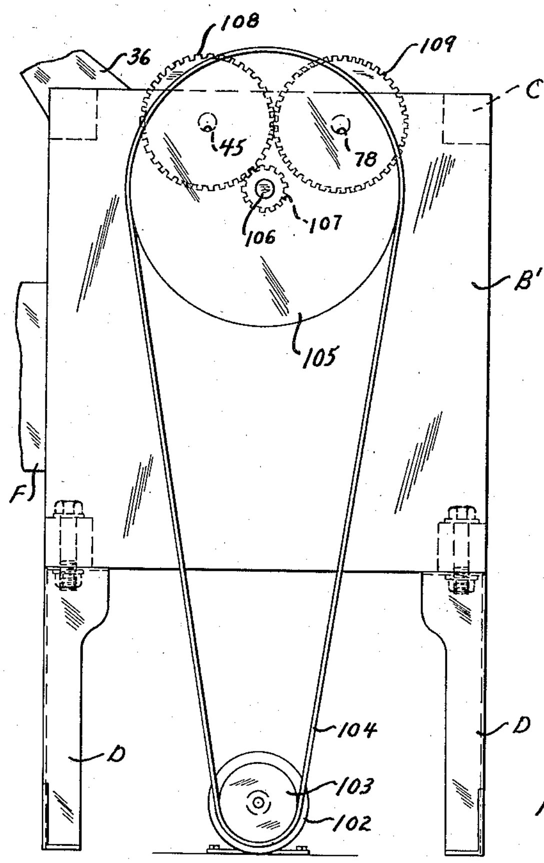
Figure 4 is a rear elevational view of said wire-forming machine.
Figure 3:
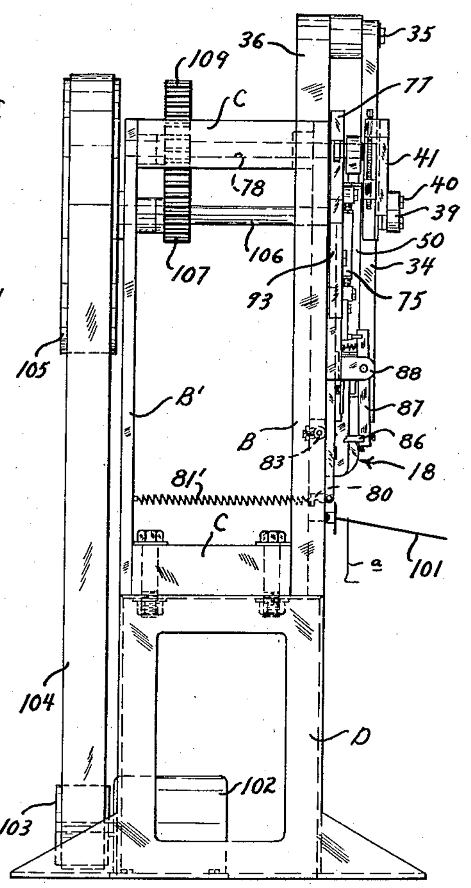
Figure 3 is a side elevational view of said wire-forming machine.
Figures 12, 13:
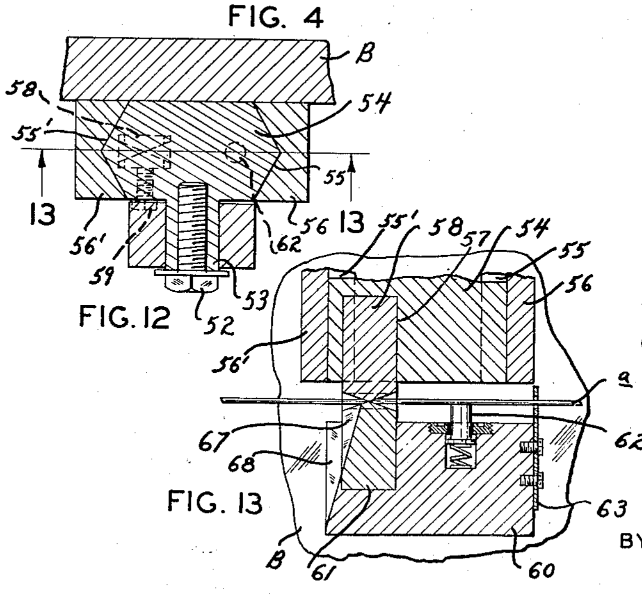
Figure 14:
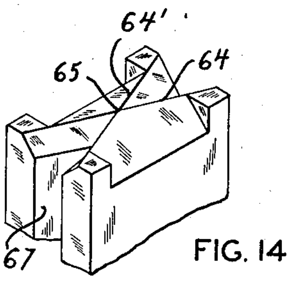
Figure 5:
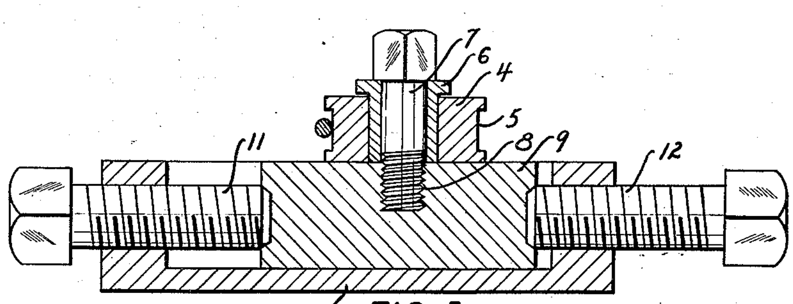
Figures 6, 7, 8, 9, 10, 11:
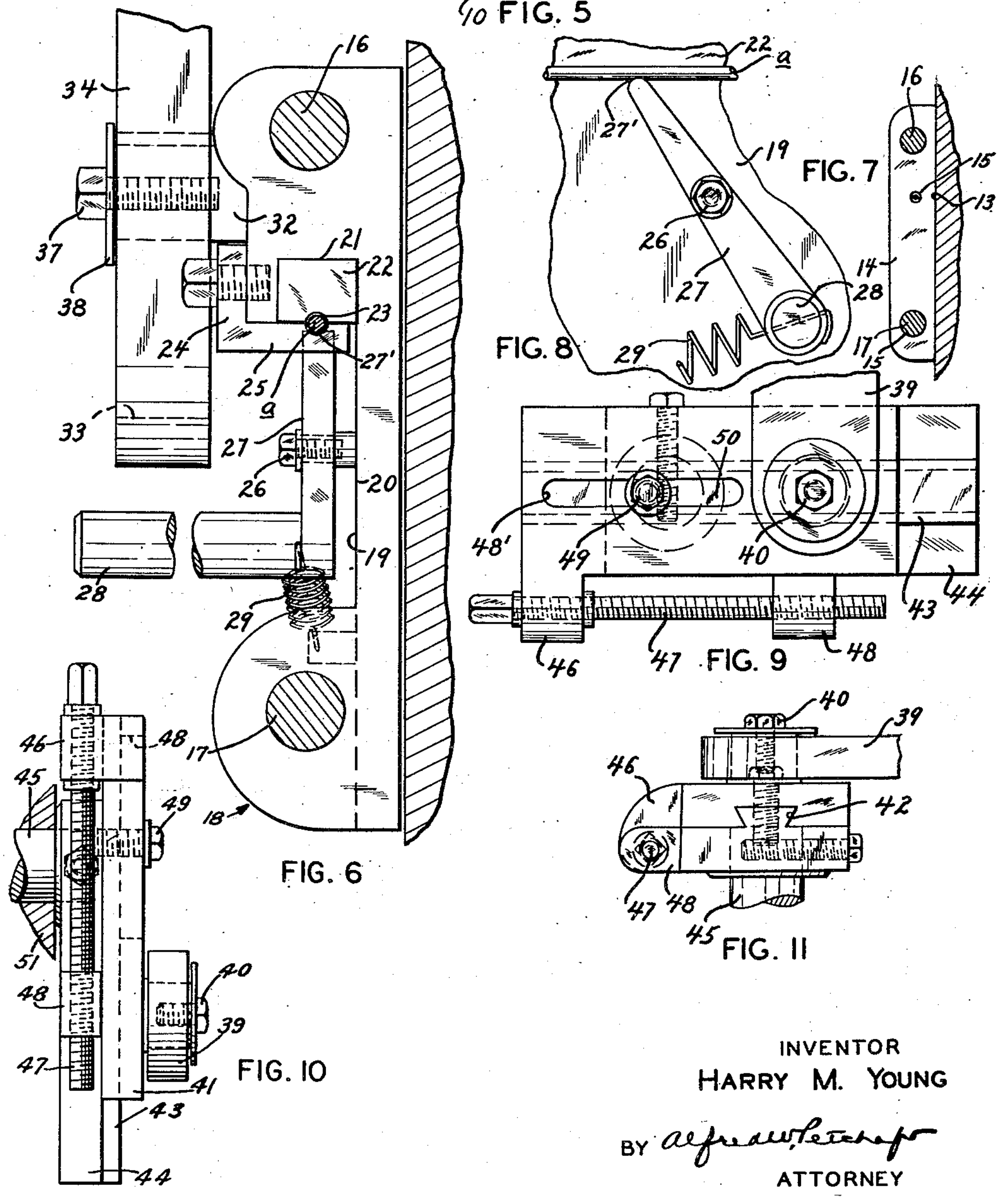
Figures 15, 16:
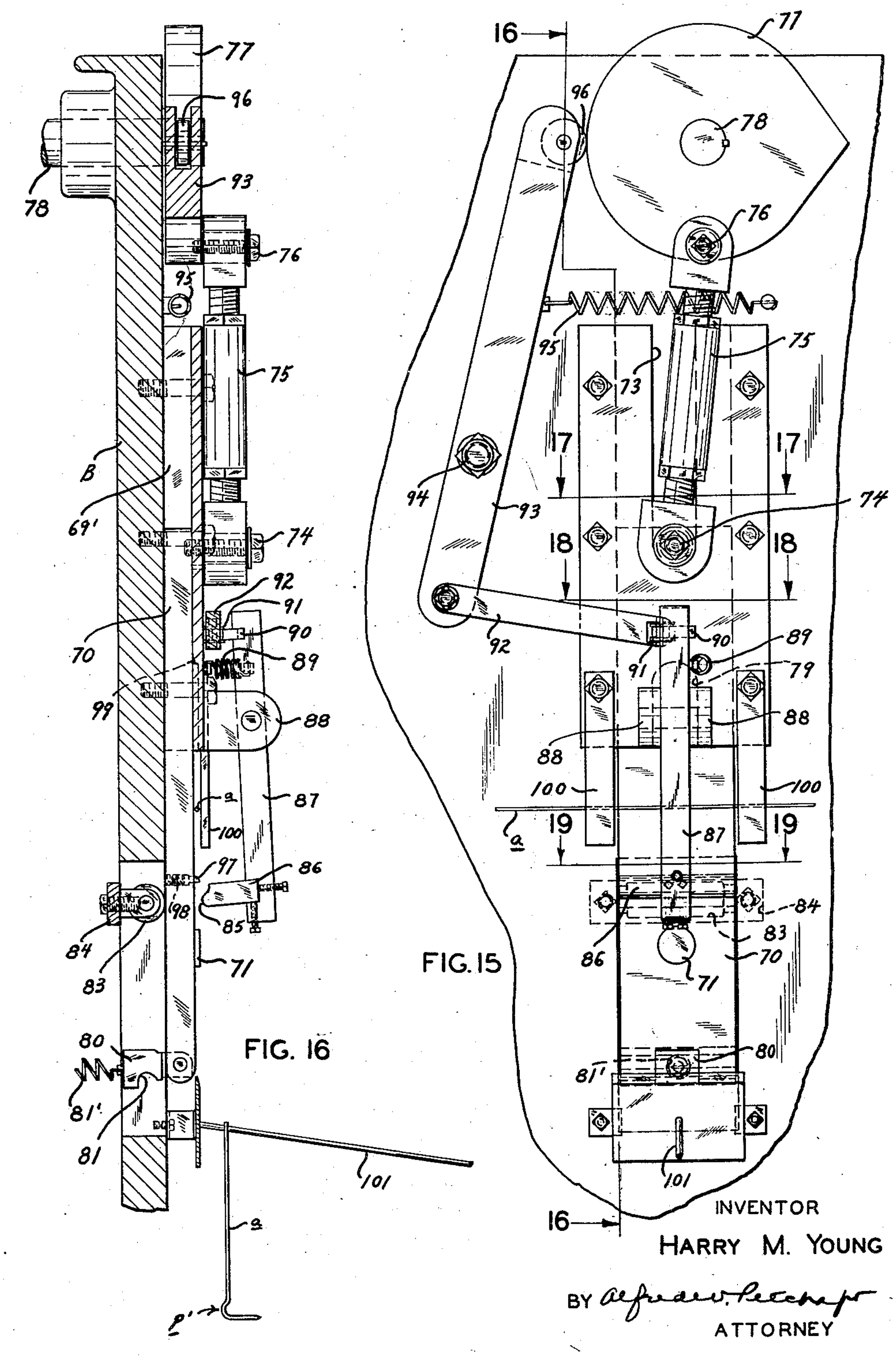
Figures 17, 18, 19, 20:
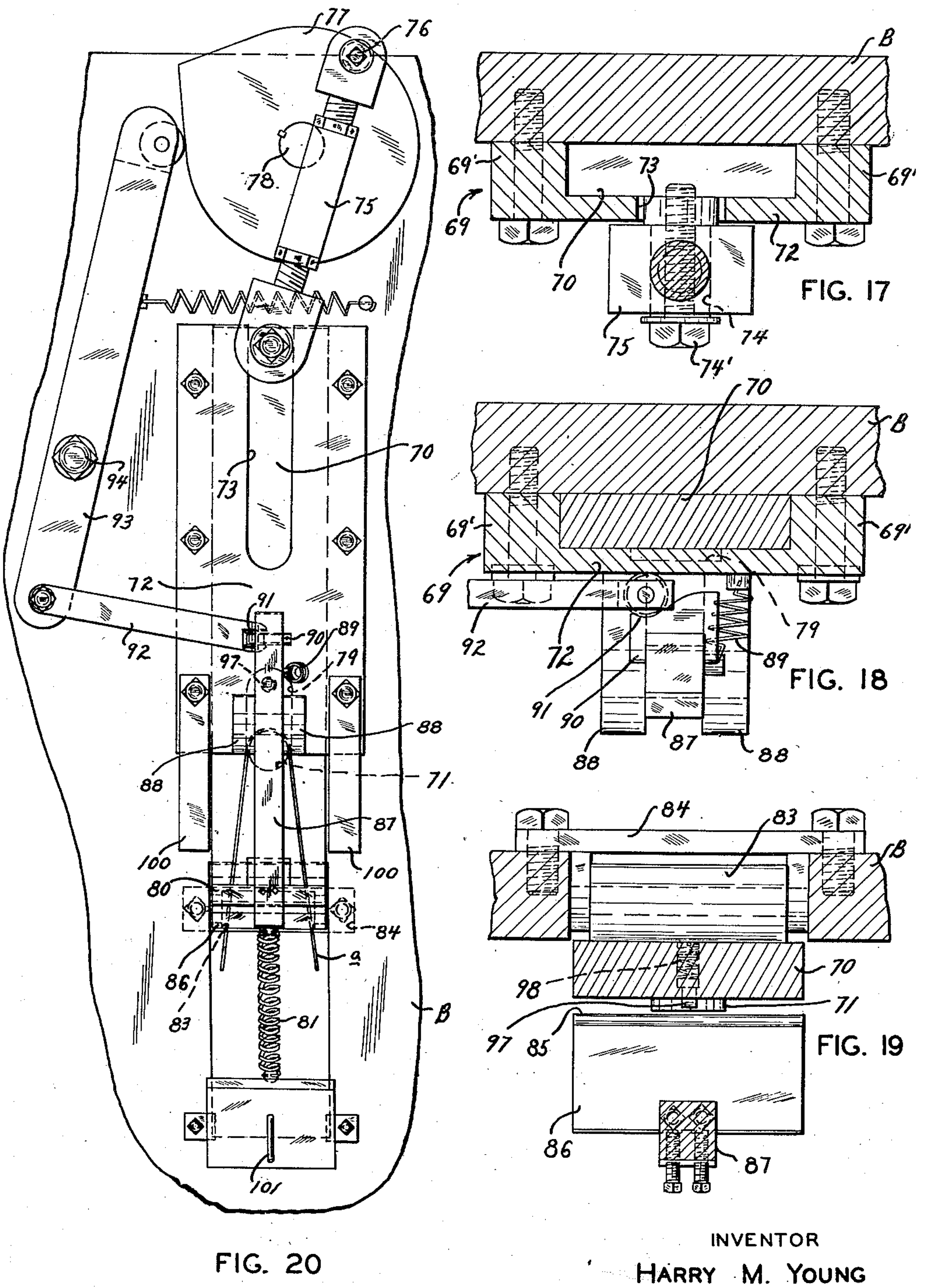
Figures 21, 22:
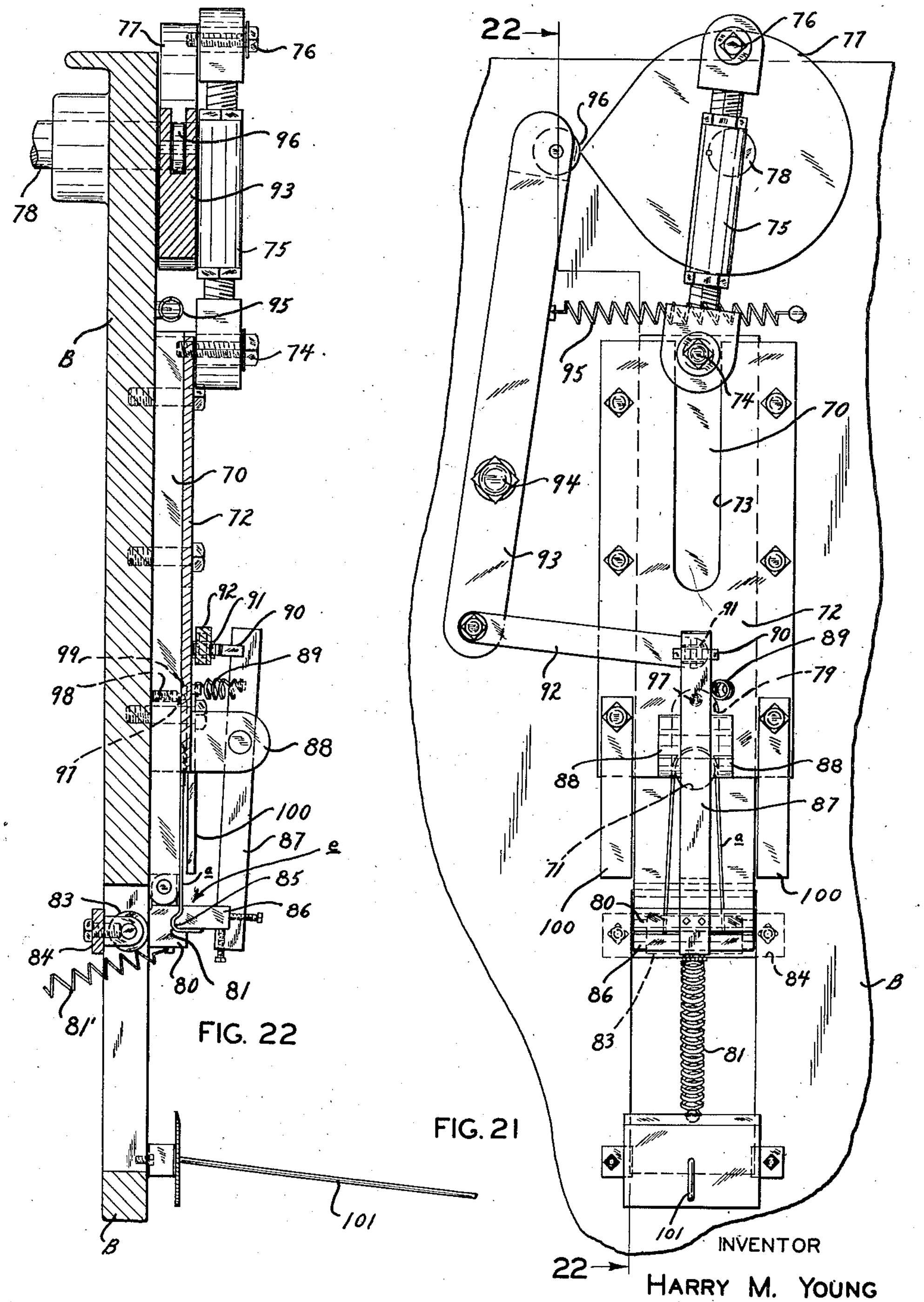
Figure 24:
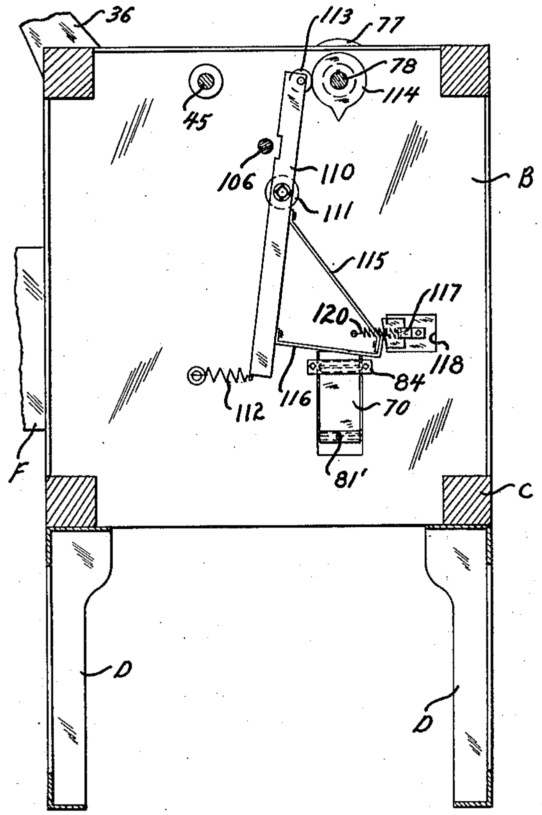
Figure 23:
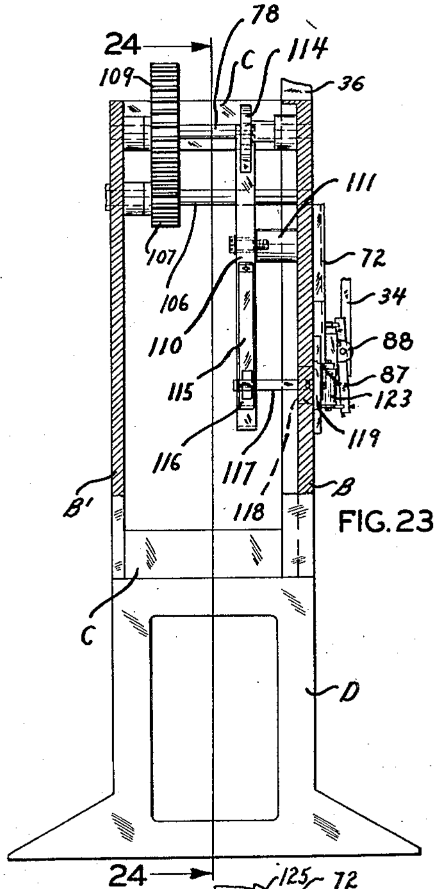
Figure 25:
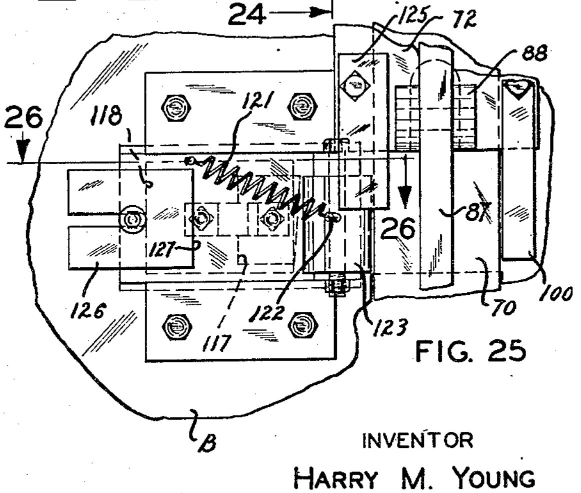

Figures 5, 6, and 7 are fragmentary transverse sectional views taken along lines 5—5, 6—6, and 7—7, respectively of Figure 1;

Figure 8 is an enlarged view of the feed dog forming a part of the present invention;

Figure 9 is an enlarged top perspective view of the adjustable eccentric forming a part of the present invention;

Figures 10, 11, and 12 are fragmentary transverse sectional views taken along lines 10—10, 11—11, and 12—12, respectively, of Figure 1;

Figure 13 is a fragmentary transverse sectional view taken along line 13—13 of Figure 12;

Figure 14 is a fragmentary perspective view of the lower anvil forming a part of the present invention;

Figure 15 is an enlarged fragmentary front view of the forming assembly forming a part of the present invention;

Figures 16, 17, 18, and 19 are fragmentary transverse sectional views taken along lines 16—16, 17—17, 18—18 and 19—19, respectively, of Figure 15;

Figures 20 and 21 are fragmentary front plan views of the forming assembly in successive stages of the wire-forming operation;

Figure 22 is a transverse sectional view taken along line 22—22 of Figure 21;

Figure 23 is an end view, partly broken away and in section, of a wire-forming machine incorporating a wire-pulling mechanism;

Figure 24 is a transverse sectional view taken along line 24—24 of Figure 23;

Figure 25 is an enlarged view of a wire-pulling mechanism; and

Figure 26:
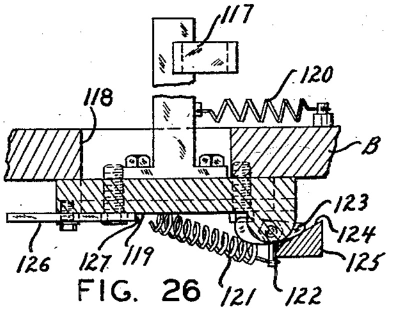

Figure 26 is a transverse sectional view taken along line 26—26 of Figure 25.

Referring now in more detail, and by reference characters to the drawings, which illustrate a preferred embodiment of my invention, A designates a wire-forming machine comprising front and rear vertical plates B, B′, secured together in spaced relation at their four corners by horizontal side rails C, and being supported on two rectangular floor standards D.

An arm F, integral with, and in the same plane as, the plate B, extends laterally therefrom and supports at its outer end, by means of a support frame 1, a conventional double roll wire-straightening mechanism generally designated G, comprising a vertical set 2 and a horizontal set 3, of rollers 4, each roller being provided with a circumferential groove 5 and being mounted on a bearing sleeve 6 which is, in turn, mounted on a stud 7 threaded at its lower end, as at 8, in a slide block 9 shiftably held in a frame 10 between the ends of opposed adjusting screws 11, 12.

Mounted in spaced relation on the outwardly presented face 13 of the arm F are two vertical members 14, 14′, having horizontally aligned feed-apertures 15, 15′, and supporting vertically spaced horizontal slide rods 16, 17. Shiftably mounted upon, and extending vertically between, the slide rods 16, 17, is a feed carriage 18 provided in its forward face 19 with a relatively wide horizontal recess or channel 20, the upper horizontal side wall of which is undercut, as at 21, for retentively accommodating a hardened guide block 22 having, along its under face, a downwardly opening slide groove 23 aligned with the feed apertures 15, 15′. Bolted on the face of the feeder carriage 18, adjacent the guide block 22, are two spaced guide clamps 24 having horizontal fingers 25 extending rearwardly beneath the guide block 22 and being complementarily grooved for loosely holding the wire *a* within the slide groove 23. Pivotally mounted upon the front vertical wall of the channel 20, by means of the pintle bolt 26, is a feed dog 27 provided at its lower end with a projecting handle 28, and being connected to one end of a tension spring 29 which is, in turn, fastened at its other end to the feed carriage 18. At its upper end, the feed dog 27 is provided with a groove 27′ for engagement with the underside of the wire *a* as it lies in the slide groove 23. Also pivoted on the arm F is a spring biased hold-back dog 30 adapted for engagement with the wire *a* as it passes over a stationary guide block 31. The feed dog 27 and hold-back dog 30 are spring biased in such a manner that when the feed carriage 18 moves forwardly (i. e. to the left, reference being had to Figure 1), the dog 27 will tighten and grip the wire $a$ so that it will be pulled forwardly with the carriage 18, and the dog 30 will correspondingly allow the wire $a$ to slide freely. Contrariwise, when the carriage 18 moves rearwardly, the dog 27 will release the wire $a$ so that the carriage 18 can slide freely with respect thereto during such return movement, while the dog 30 will tend to grip the wire $a$ and hold it stationary.

Formed integrally with the feed carriage 18, and extending outwardly therefrom, is a cylindrical boss 32 projecting slidably through an elongated slot 33, formed in the lower end of an upwardly extending link 34 which is, in turn, pivoted at its upper end on a boss 35 formed upon an arm 36 extending upwardly and rearwardly from the plate B. The boss 32 is held within the slot 33 by means of a headed bolt 37 and washer 38, as best seen in Figure 6.

Rockably secured to the link 34, approximately midway between its ends, is a pitman or connecting rod 39 pivotally secured at its forward end by a crank pin 40 on an outer plate 41, provided on its under face with ways 42, slidably engaging a slide tongue 43 of an inner plate 44 rigidly pinned upon the end of a crank shaft 45 for rotation therewith. Formed preferably integrally with, and extending laterally from the end of, the plate 41 is a projecting arm 46 for rotatively supporting one end of an adjustment screw 47 which is operatively threaded at its other end in a boss 48 formed integrally with the inner plate 44 for permitting adjustment of the distances between the center of the crank pin 40 and the crank shaft 45, whereby the amount of throw of the link 34 may be set and the stroke of the feed carriage 18 adjusted, as necessary for various desired lengths of tie-irons. The outer plate 41 is further provided with an elongated slot 48' for receiving a locking bolt 49 which is, in turn, threaded into the inner plate 44 for tightly securing the outer and inner plates 41, 44, in any desired position of adjustment.

Keyed upon the crank shaft 45, between the inner plate 44 and the plate B, is an eccentric 50, and operatively mounted at its upper end thereon is an adjustable length pitman 51 connected at its lower end by means of a pin 52 to a boss 53, extending outwardly from a plate 54, the latter being slidably retained, in flat surface abutment against the plate B, in vertical ways 55, 55', provided by the bars 56, 56'. Upon its under face, the plate 54 is provided with an upwardly extending rectangular recess 57 for receiving a projecting shear block 58 held in place by a set screw 59. Mounted on the plate B, beneath the bars 56, 56', is a base block 60, provided in its upper face with a stationary shear block 61 and a spring-pressed plunger 62. Upon its rearwardly presented side face the block 60 is provided with an apertured guide plate 63 for directing the wire $a$ between the shear blocks 58, 61. The matching faces of the shear blocks 58, 61, are complementary in design and are respectively provided with two diagonal ridges 64, 64', intersecting centrally, as at 65, and are cut away angularly therefrom in the provision of V-shaped forming-recesses, so that the cut off ends of the wire $a$ will be sharp and pointed, as shown at $p$ in Figure 2. A groove 67 in the forward face of shear block 61 opens into a groove 68 in the forward face of the mounting stationary block 60 and provides a pathway for the rearwardly sheared end of the wire $a$ to drop downwardly clear of the block 58, as will be presently more fully pointed out. The plunger 62 forces the wire $a$ upwardly to prevent any adherence to the stationary shear block 61.

Bolted upon the face of plate B, forwardly of the shearing plate ways 55, 55', is a way-forming member 69 integrally provided, along its lateral margins, with inwardly projecting vertical ways 69', 69', for slidably supporting a forming slide 70 provided, adjacent its lower end, with a circular boss 71. Extending between, and fixed in a stationary position on the ways 69', 69', in overlying relation to the slide 70, is a forming plate 72 provided with a central slot 73 extending downwardly from the upper margin thereof for clearing a pintle 74 formed integrally with, and projecting outwardly from, the slide 70 through the slot 73, and being attached, by means of a shouldered stud 74', to the lower end of an adjustable link 75 which is, in turn, eccentrically journaled, at its upper end, by means of a crank pin 76 to cam 77 keyed upon the projecting end of an auxiliary shaft 78.

Axially aligned with the slot 73 and extending upwardly from the lower margin of the forming slide 70 is a forming slot or recess 79 for accommodating the boss 71 when moving upwardly upon upward movement of the slide 70, thereby carrying the central portion of the sheared section of wire $a$ upwardly into the forming slot 79, and the walls of the slot 79 cause the wire $a$ to bend into the shape of an inverted U, substantially as shown in Figure 20 the boss or member 71 is thus shaped for a complementarily fitted disposition within the slot or recess 79.

Swingably mounted along the lower transverse margin of the slide 70 is a female die 80 provided with a forming groove 81 and biased downwardly and rearwardly by a spring 81', which extends through a clearance slot in the plate B and is secured at its end to the plate B'. Upward movement of the slide 70 causes the back face of the die 80 to strike a roller 83 mounted on a cross bar 84 suitably secured to the back face of plate B, whereby the die 80 is pivoted approximately 90° bringing the concave forming groove 81 into co-operating position with the complementary face 85 of a male forming die 86 mounted on the lower end of a lever 87, for forming the ends of a pipe-hanger $h$, as shown at $e$ in Figure 22.

The lever 87 is pivotally mounted between projecting ears 88 fixed upon the outer face of the forming plate 72 and, at its upper end, is biased toward the plate 72 by a tension spring 89 for inwardly and outwardly rocking action. Fixed in the upper end of the lever 87 is a cam-block 90 positioned for co-operation with a cam roller 91 mounted on one end of a link 92, the other end of which is connected to a lever 93, pivoted at 94 and attached to one end of a spring 95, secured at its other end to the plate B. At its upper end, the lever 93 is provided with a cam-following roller 96 for engagement with the periphery of cam 77.

Shiftably mounted in, and projecting horizontally outwardly from, the outer face of the slide 70, in upwardly spaced relation to the circular boss 71 is a stripper tongue 97 urged resiliently outwardly by a small compression spring 98, and being provided on its outer extremity with an upwardly and inwardly inclined face. The forming plate 72 is provided, upon its inner face, centrally of the upwardly curving margin of the forming slot 79, with a shallow camming recess 99 for co-operation with the stripper tongue 97. As the slide moves upwardly the stripper tongue 97 will initially strike against the underside of the cut off length of wire *a*, which is held against the face of the slide 70 and prevented from horizontally outward movement by means of flat depending fingers 100 bolted or otherwise suitably secured upon the face of the forming plate 72. The tongue 97 is consequently pressed inwardly as it passes behind the wire *a* and upon continued upward movement of the slide 70 engages the camming recess 99 by which it is again pressed inwardly so as to slide upwardly against the inward face of the forming plate 72 as the wire *a* is carried upwardly by the circular boss 71 and bent into U-shaped configuration by co-operation with the forming slot 79.

As this initial wire-forming operation is completed, and the slide 70 reaches the upward limits of its travel, the high spot on the cam 77 will engage the cam following roller 96 and kick the upper end of lever 93 forwardly, to move the lower end thereof and the link 92 associated therewith inwardly, thus transmitting movement through the cam block 90 to the lever 87 and thereby shifting the male forming die 86 inwardly, thereby forming the lower portion of the pipe hanger, as at *p'*.

Upon completion of the bottom-forming operation, the male forming die 86 will move outwardly again, and the slide 70 will start to move downwardly to its original position. Upon downward movement of the slide 70, the stripper tongue 97 will move outwardly into the camming groove 99 of the forming plate 72 and strip the finished pipe hanger out of the forming slot 79. As the slide 70 reaches the lower limit of its movement, the pipe hanger will fall freely downwardly and come to rest on the inclined delivery rod 101 which is suitably secured upon the plate B in downwardly spaced relation to the lowermost position of the forming slide 70 and is inclined at such an angle that the pipe hanger will fall downwardly by gravity and drop into a conventional catch bin (not shown).

The wire-forming machine A is driven from a conventional electric motor 102 which is mounted in the usual manner by means of lag bolts directly upon the floor between the standards D, and is provided with a sheave 103 which is, in turn, connected by a belt 104 to a large driving pulley 105 which is keyed upon the rearwardly projecting end of a shaft 106, the latter being suitably journalled in, and extending horizontally between, the plates B, B'. Keyed, or otherwise suitably mounted, upon the shaft 106 for rotation therewith is a small spur gear 107, meshing with a larger spur gear 108 which is, in turn, pinned upon the crank shaft 45 and is also in meshing engagement with a spur gear 109 pinned upon the auxiliary shaft 78.

In making pipe hangers for large pipes, a substantial amount of wire must necessarily be fed into the machine. To facilitate smooth operation, an auxiliary feeding mechanism for pulling the wire through may, if desired, be provided, comprising a lever 110 pivotally mounted on a bos 111 extending from the inner face of plate B, and being attached, at its lower end, to a spring member 112. At its upper end, the lever 110 is provided with a cam following roller 113 for co-operative engagement with an eccentric cam 114 keyed upon the auxiliary shaft 78. Arms 115, 116, extending from the lever 110, are joined at their ends to contact a T-shaped member 117 extending through an aperture 118 in the plate B for supporting a plate 119. The member 117 and the plate 119 are normally biased to the right (reference being made to Figure 26), by means of a spring member 120. Attached to the face of the plate 119 is a spring 121 secured, at its other end, to a pin 122 mounted on a cam-faced jaw 123 contoured for rocking movement in co-operation with the sloping face 124 of a stationary plate 125, as best seen in Figures 25 and 26. A plate 126 mounted flatwise upon plate 119 by its rearward margin 127 provides a stop-abutment for wire being fed through the machine.

In operation, the interaction of the cam roller 113 and the eccentric cam 114 imparts a forward and return movement to the lever 110, whereby the T-shaped member 117 is caused to slide correspondingly to and fro within the aperture 118. On the forward movement, the wire is pulled, being gripped between the plate 119 and the jaw 123. Travelling oppositely over the face 124 on the return movement, the jaw 123 pivots to release its contact with the wire, which is then being pulled rearwardly and upwardly by the action of the slide 70.

It should be understood that changes and modifications in the form, construction, arrangement, and combination of the several parts of the wire-forming machine may be made and substituted for those herein shown and described without departing from the nature and principle of my invention.

Having thus described my invention, what I claim and desire to secure by Letters Patent is:

1. In a machine for forming a piece of wire into a predetermined shape, a stationary plate having a recess of predetermined length, a reciprocating slide having a member shaped for complementarily fitted disposition within said recess and being adapted to engage and force a section of wire into said recess for bending it into conformity to the shape thereof, said recess being of such depth that when the wire section is pushed thereinto the wire section will project outwardly therefrom at its ends, a female die member hingedly mounted on the lower margin of the slide, and means for swinging the female die member into operative position as the slide moves upwardly, and a male die member mounted on the stationary plate and adapted in timed relation to the movement of the slide, for forming the lower ends of the piece of wire in the female die member.

2. In a machine for forming a piece of wire into a predetermined shape, a stationary plate having a recess of predetermined length, a reciprocating slide having a member shaped for complementarily fitted disposition within said recess and being adapted to engage and force a section of wire into said recess for bending it into conformity to the shape thereof, said recess being of such depth that when the wire section is pushed thereinto the wire section will project outwardly therefrom at its ends, a female die member hingedly mounted on the lower margin of the slide, means for swinging the female die member into operative position as the slide moves upwardly, and a male die member operatively mounted on the stationary plate for swingable movement toward and away from, and in timed relation to the movement of, the slide for forming the lower ends of the piece of wire in the female die member.

3. In a machine for forming a piece of wire into a predetermined shape, a stationary plate having a recess of predetermined length, a reciprocating slide having a member shaped for complementarily fitted disposition within said recess and being adapted to engage and force a section of wire into said recess for bending it into conformity to the shape thereof, said recess being of such depth that when the wire section is pushed thereinto the wire section will project outwardly therefrom at its ends, a female die member hingedly mounted on the lower margin of the slide, means for swinging the female die member into operative position as the slide moves upwardly, a driving shaft, a cam wheel mounted on the driving shaft, a link eccentrically journaled at one end to the face of the cam and at the other end to the slide for reciprocating the slide as the shaft rotates, said cam being provided on its periphery with a high-spot, a male die member, and a lever drivingly connected at one end to the male die member and being provided at its other end with a cam follower for engagement with the periphery of the cam, the cam high-spot being so located with respect to the point of connection of the link to the cam as to cause operative movement of the male die member as the slide reaches one end of its path of reciprocating movement.

4. In a machine for forming a piece of wire into a predetermined shape, a stationary plate having a recess of predetermined length, a reciprocating slide having a member shaped for complementarily fitted disposition within said recess and being adapted to engage and force a cut-off section of wire into said recess for bending it into conformity to the shape thereof, said recess being of such depth that when the wire section is pushed thereinto the wire section will project outwardly therefrom at its ends, a spring pressed tongue mounted in the slide and being beveled for passing freely behind the wire and the margins of the recess on the up-stroke of the slide and being further adapted upon the down-stroke of the slide to engage and strip the formed wire out of the recess, a female die member hingedly mounted on the lower margin of the slide means for swinging the female die member outwardly into operative position as the slide moves upwardly, a male die member operatively mounted on the stationary plate adapted for co-operation with the female die member to bend the projected ends of the wire section as the slide reaches the upper end of its stroke.

5. In a machine for forming a piece of wire into a predetermined shape, a stationary plate having a recess of predetermined length, a reciprocating slide having a circular boss adapted for fitted disposition within said recess, a female die member hingedly mounted on the lower margin of the slide and normally disposed rearwardly thereof, cam means adapted for engaging said female die member upon upward movement of the slide to rock said member into operative position, a lever operatively mounted for rocking movement on the stationary plate, a male die member mounted on and carried by the lever for engaging said female die member for forming the ends of a piece of wire therein, and means for reciprocating said slide.

6. In a machine for morming a piece of wire into a predetermined shape, a stationary plate having a recess of predetermined length, a reciprocating slide having a member shaped for complementarily fitted disposition within said recess for forming the central portion of a piece of wire, a female die member hingedly mounted on the lower margin of the slide, spring means for normally biasing said female die member in a position rearwardly of said slide, a roller member mounted upon said machine and adapted for engaging said die member upon upward movement of the slide for causing said female die member to be swung into operative position, a cam, means associated with said cam for reciprocating said slide, a male die member operatively mounted on the stationary plate for swingable movement toward and away from, and in timed relation to the movement of, the slide, a lever drivingly connected at one end to the male die member, and a cam follower provided on the other end of said link and adapted for engagement with the periphery of the cam whereby said male die member will be engaged with the female die member for forming the ends of a piece of wire when the slide reaches one end of its path of reciprocating movement.

7. In a machine for forming a piece of wire into a predetermined shape, a stationary plate having a recess of predetermined length, a reciprocating slide having a forming member shaped for complementarily fitted disposition within said recess for forming the central portion of a piece of wire, and a spring pressed stripper tongue mounted in the slide, the forward end of said stripper tongue being beveled, said stationary plate also being provided with a camming groove for receiving the beveled end of said stripper tongue upon upward movement of the slide whereby said tongue is pressed inwardly, said camming groove being axially aligned with said recess whereby upon downward movement of the slide the stripper tongue will be forced outwardly into said recess for removing any formed wire piece which remains in said recess after completion of the forming operation.

HARRY M. YOUNG.

REFERENCES CITED

The following references are of record in the file of this patent:

UNITED STATES PATENTS

| Number | Name | Date |
|---|---|---|
| 145,250 | Spencer | Dec. 2, 1873 |
| 159,314 | Foster | Feb. 2, 1875 |
| 172,428 | Haddock | Jan. 18, 1876 |
| 237,397 | Lewthwaite | Feb. 8, 1881 |
| 303,289 | Jacobs | Aug. 12, 1884 |
| 319,206 | Dodge | June 2, 1885 |
| 343,700 | Cortright | June 15, 1886 |
| 636,272 | Middlebrook | Nov. 7, 1899 |
| 718,961 | Yeatman | Jan.20, 1903 |
| 904,563 | Rau | Nov. 24, 1908 |
| 1,106,484 | Young | Aug. 17, 1912 |
| 1,309,660 | Smith | July 15, 1919 |
| 1,342,712 | Carllus | June 8, 1920 |
| 1,432,770 | Mackenzie | Oct. 24, 1922 |
| 1,562,973 | Kuester | Nov. 24, 1925 |
| 1,666,380 | Heinle | Apr. 17, 1928 |
| 1,823,090 | Craigo | Sept. 15, 1931 |
| 1,882,243 | Dailey | Oct. 11, 1932 |
| 2,048,459 | Moffett | July 21, 1936 |
| 2,106,945 | Francis | Feb. 1, 1938 |
| 2,190,722 | Martin | Feb. 20, 1940 |

FOREIGN PATENTS

| Number | Country | Date |
|---|---|---|
| 2,988 | Great Britain | Dec. 2, 1857 |